US012225458B2

(12) United States Patent
Cozzo et al.

(10) Patent No.: US 12,225,458 B2
(45) Date of Patent: Feb. 11, 2025

(54) METHOD AND APPARATUS FOR SAME POWER TRANSMISSIONS

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 17/930,380

(22) Filed: Sep. 7, 2022

(65) Prior Publication Data

US 2023/0091270 A1    Mar. 23, 2023

Related U.S. Application Data

(60) Provisional application No. 63/298,041, filed on Jan. 10, 2022, provisional application No. 63/246,141, filed on Sep. 20, 2021.

(51) Int. Cl.
*H04W 52/02*    (2009.01)
*H04W 52/14*    (2009.01)
*H04W 52/22*    (2009.01)
*H04W 52/26*    (2009.01)
*H04W 52/28*    (2009.01)
(Continued)

(52) U.S. Cl.
CPC ..... *H04W 52/0206* (2013.01); *H04W 52/262* (2013.01)

(58) Field of Classification Search
CPC ............. H04W 52/02; H04W 52/0203; H04W 52/0212; H04W 52/0216; H04W 52/0219; H04W 52/0222; H04W 52/26; H04W 52/262
See application file for complete search history.

(56) References Cited

U.S. PATENT DOCUMENTS

2002/0039355 A1\*  4/2002  Yun ..................... H04W 72/542
                                                    370/333
2018/0242265 A1\*  8/2018  Larsson ................ H04W 52/60
2020/0052827 A1    2/2020  Vilaipornsawai et al.

OTHER PUBLICATIONS

International Search Report and Written Opinion issued Dec. 13, 2022 regarding International Application No. PCT/KR2022/013916, 6 pages.
(Continued)

*Primary Examiner* — Jenee Holland

(57) ABSTRACT

Methods and apparatuses for same power transmissions. The method includes receiving first information indicating use of a same power for transmission of a channel over more than one slot and second information indicating use of a same power, after a change in power, for transmission of the channel over more than one slot. The method further includes determining a first number of consecutive slots, a second number of consecutive slots, from the first number of consecutive slots, for transmission of the channel with a same power, and a third number of consecutive slots, from the first number of consecutive slots and after the second number of consecutive slots, for transmission of the channel with a same power. The method further includes transmitting the channel with a first power in slots from the second number of consecutive slots and a second power in slots from the third number of consecutive slots.

20 Claims, 12 Drawing Sheets

(51) Int. Cl.
*H04W 52/32* (2009.01)
*H04W 72/0446* (2023.01)
*H04W 72/232* (2023.01)

(56) References Cited

OTHER PUBLICATIONS

VIVO, "Discussion on Joint channel estimation for PUSCH", 3GPP TSG RAN WG1 Meeting #106-e, R1-2106613, Aug. 2021, 10 pages.
ZTE Corporation, "Discussion on joint channel estimation for PUSCH", 3GPP TSG RAN WG1 Meeting #106-e, R1-2106741, Aug. 2021, 13 pages.
Huawei et al., "Discussion on joint channel estimation for PUSCH", 3GPP TSG RAN WG1 Meeting #106-e, R1-2106497, Aug. 2021, 11 pages.
Intel Corporation, "Discussion on joint channel estimation for PUSCH", 3GPP TSG RAN WG1 Meeting #106-e, R1-2107604, Aug. 2021, 9 pages.

"3rd Generation Partnership Project; Technical Specification Group Radio Access Network; NR; Physical channels and modulation (Release 17)", 3GPP TS 38.211 V17.2.0, Jun. 2022, 136 pages.
"3rd Generation Partnership Project; Technical Specification Group Radio Access Network; NR; Multiplexing and channel coding (Release 17)", 3GPP TS 38.212 V17.2.0, Jun. 2022, 201 pages.
"3rd Generation Partnership Project; Technical Specification Group Radio Access Network; NR; Physical layer procedures for control (Release 17)", 3GPP TS 38.213 V17.2.0, Jun. 2022, 256 pages.
"3rd Generation Partnership Project; Technical Specification Group Radio Access Network; NR; Physical layer procedures for data (Release 17)," 3GPP TS 38.214 V17.2.0 , Jun. 2022, 228 pages.
"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.
"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

* cited by examiner

METHOD AND APPARATUS FOR SAME POWER TRANSMISSIONS

CROSS-REFERENCE TO RELATED APPLICATION AND CLAIM OF PRIORITY

This application claims priority under 35 U.S.C. § 119(e) to U.S. Provisional Patent Application No. 63/246,141 filed on Sep. 20, 2021 and U.S. Provisional Patent Application No. 63/298,041 filed on Jan. 10, 2022. The above-identified provisional patent applications are hereby incorporated by reference in their entirety.

TECHNICAL FIELD

The present disclosure relates generally to wireless communication systems and, more specifically, the present disclosure relates to same power transmissions or receptions and, in various embodiments, demodulation reference signal (DM-RS) filtering for time division duplexing (TDD) and frequency division duplexing (FDD) modes.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to method and apparatus for same power transmissions or receptions and, in various embodiments, DM-RS filtering for TDD and FDD modes.

In one embodiment, a user equipment (UE) is provided. The UE includes a transceiver configured to receive first information indicating use of a same power for transmission of a channel over more than one slot and second information indicating use of a same power, after a change in power, for transmission of the channel over more than one slot. The UE further includes a processor operably coupled to the transceiver. The processor is configured to determine a first number of consecutive slots for transmission of the channel, a second number of consecutive slots, from the first number of consecutive slots, for transmission of the channel with a same power, and a third number of consecutive slots, from the first number of consecutive slots and after the second number of consecutive slots, for transmission of the channel with a same power. The transceiver is further configured to transmit the channel with a first power in slots from the second number of consecutive slots and a second power in slots from the third number of consecutive slots.

In another embodiment, a base station (BS) is provided. The BS includes a transceiver configured to transmit first information indicating use of a same power for reception of a channel over more than one slot and second information indicating use of a same power, after a change in power, for reception of the channel over more than one slot. The BS also includes a processor operably coupled to the transceiver. The processor is configured to determine a first number of consecutive slots for reception of the channel, a second number of consecutive slots, from the first number of consecutive slots, for reception of the channel with a same power, and a third number of consecutive slots, from the first number of consecutive slots and after the second number of consecutive slots, for reception of the channel with a same power. The transceiver is further configured to receive the channel with a first power in slots from the second number of consecutive slots and a second power in slots from the third number of consecutive slots.

In yet another embodiment, a method is provided. The method includes receiving first information indicating use of a same power for transmission of a channel over more than one slot and second information indicating use of a same power, after a change in power, for transmission of the channel over more than one slot. The method further includes determining a first number of consecutive slots for transmission of the channel, a second number of consecutive slots, from the first number of consecutive slots, for transmission of the channel with a same power, and a third number of consecutive slots, from the first number of consecutive slots and after the second number of consecutive slots, for transmission of the channel with a same power. The method further includes transmitting the channel with a first power in slots from the second number of consecutive slots and a second power in slots from the third number of consecutive slots.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
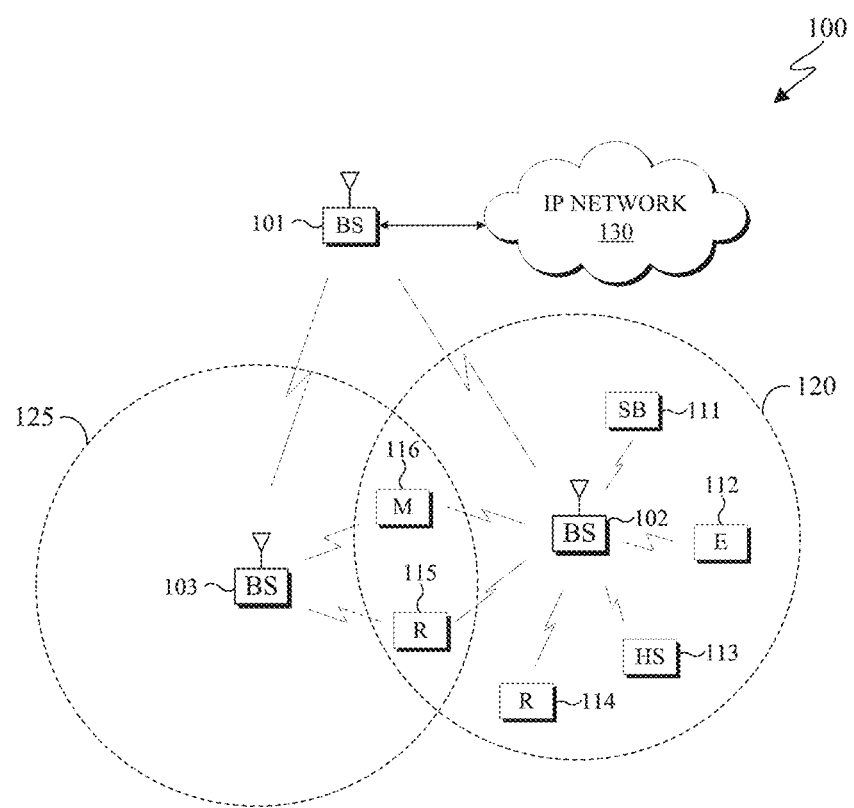
FIG. 1 illustrates an example wireless network according to embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v17.2.0, "NR; Physical channels and modulation" ("REF1"); 3GPP TS 38.212 v17.2.0, "NR; Multiplexing and channel coding" ("REF2"); 3GPP TS 38.213 v17.2.0, "NR; Physical layer procedures for control;" ("REF3"); 3GPP TS 38.214 v17.2.0, "NR; Physical layer procedures for data" ("REF4"); 3GPP TS 38.321 v17.1.0, "NR; Medium Access Control (MAC) Protocol Specification" ("REF5"); and 3GPP TS 38.331 v17.1.0, "NR; Radio Resource Control (RRC) Protocol Specification" ("REF6").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
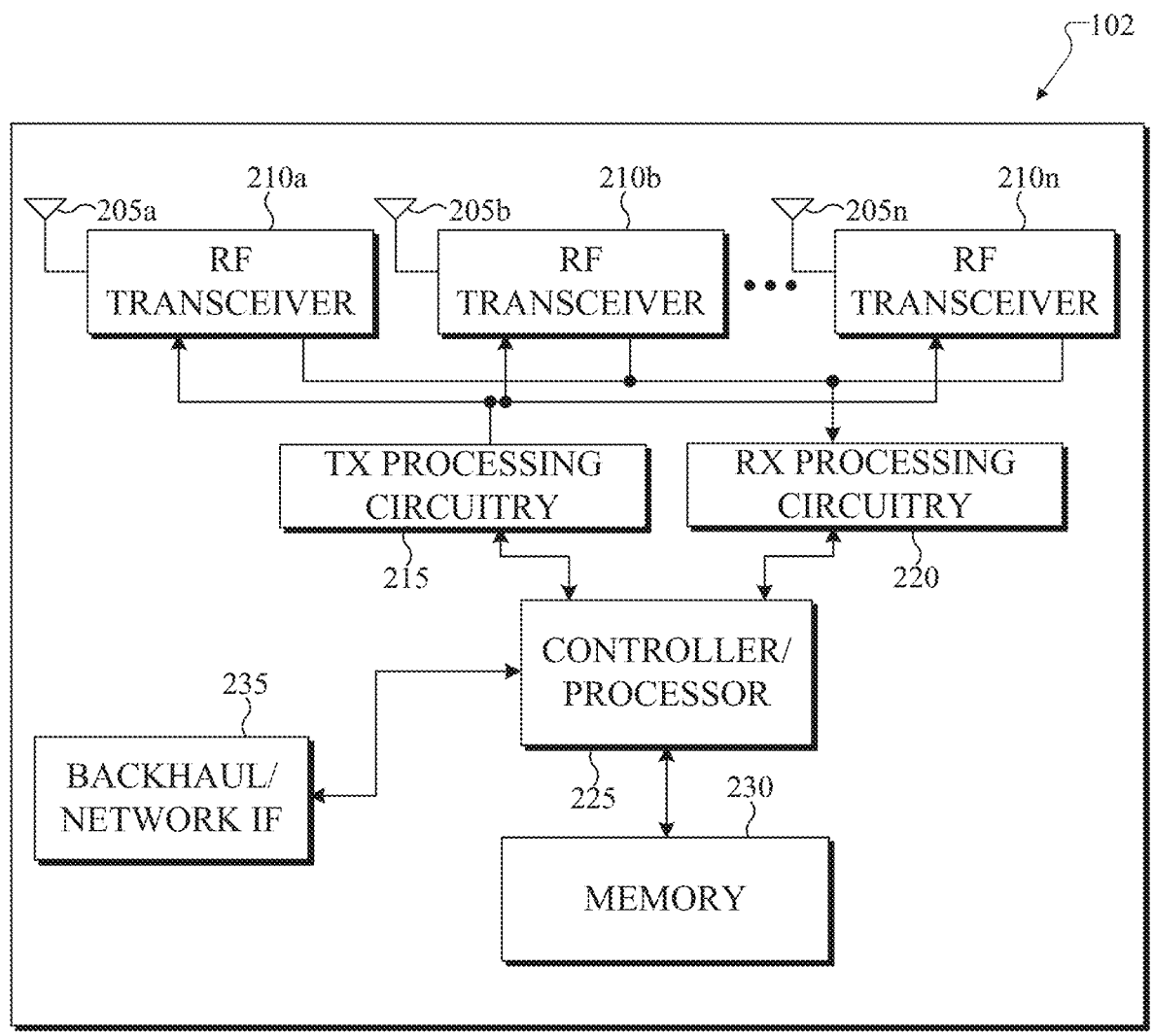
FIG. 2 illustrates an example BS according to embodiments of the present disclosure.
Figure 3:
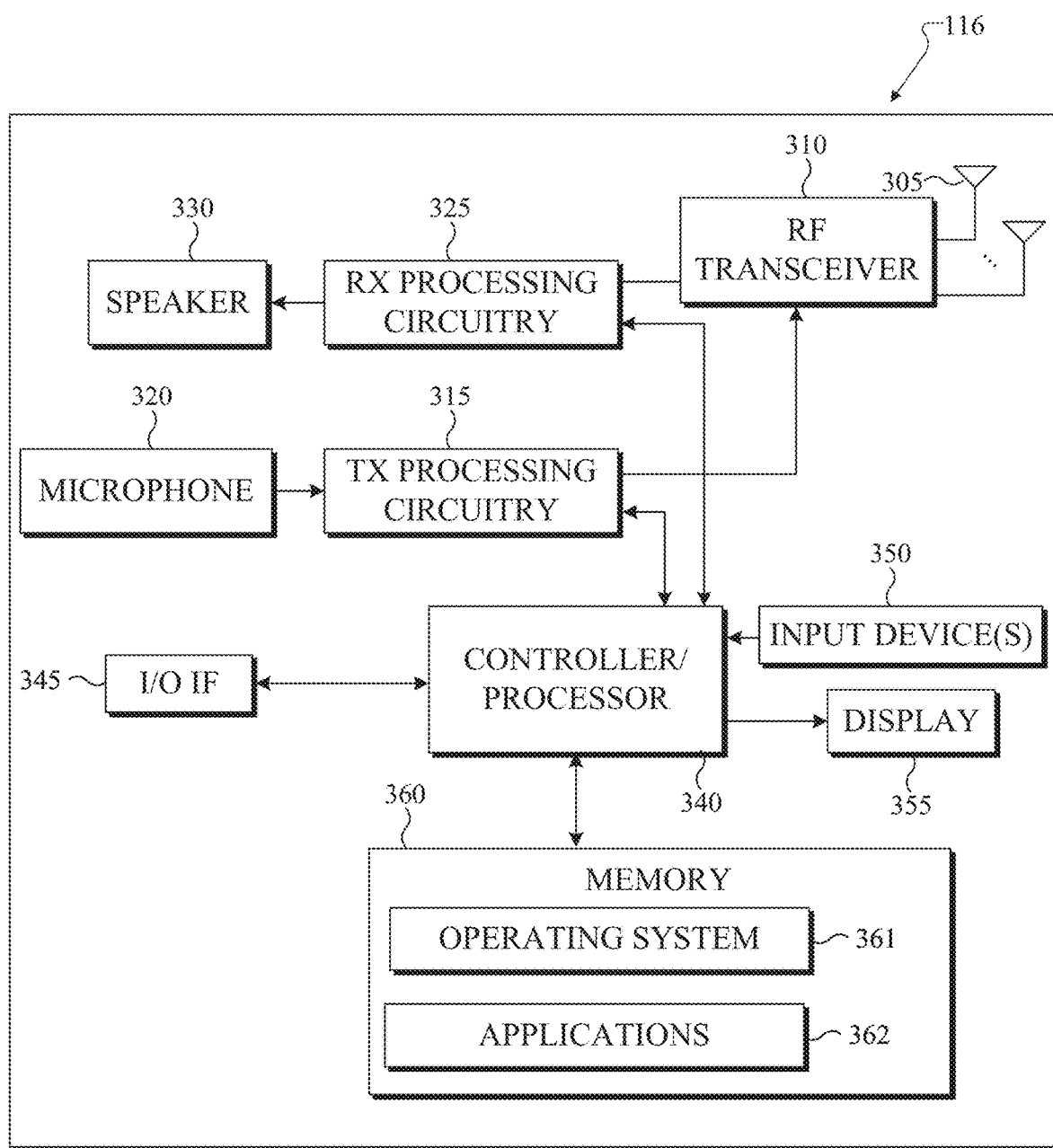
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programming, or a combination thereof for same power transmissions and, in various embodiments, DM-RS filtering for TDD and FDD modes. In certain embodiments, and one or more of the BSs 101-103 includes circuitry, programing, or a combination thereof for same power reception and, in various embodiments, DM-RS Filtering for TDD and FDD Modes.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support same power receptions and, in various embodiments, DM-RS filtering for TDD and FDD Modes. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for same power transmissions and, in various embodiments, DM-RS filtering for TDD and FDD modes. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
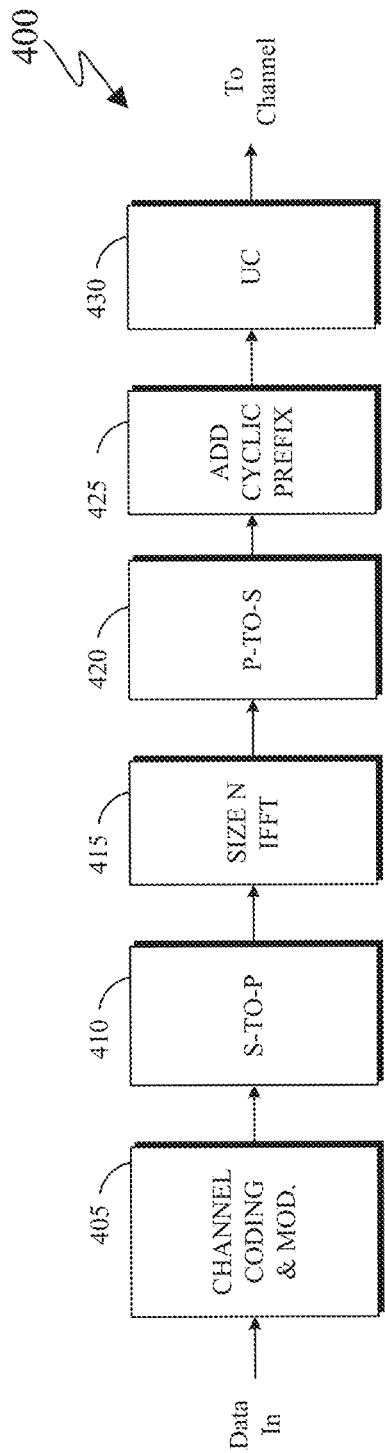
FIGS. 4 and 5 illustrate example wireless transmit and receive paths according to embodiments of the present disclosure.
Figure 5:
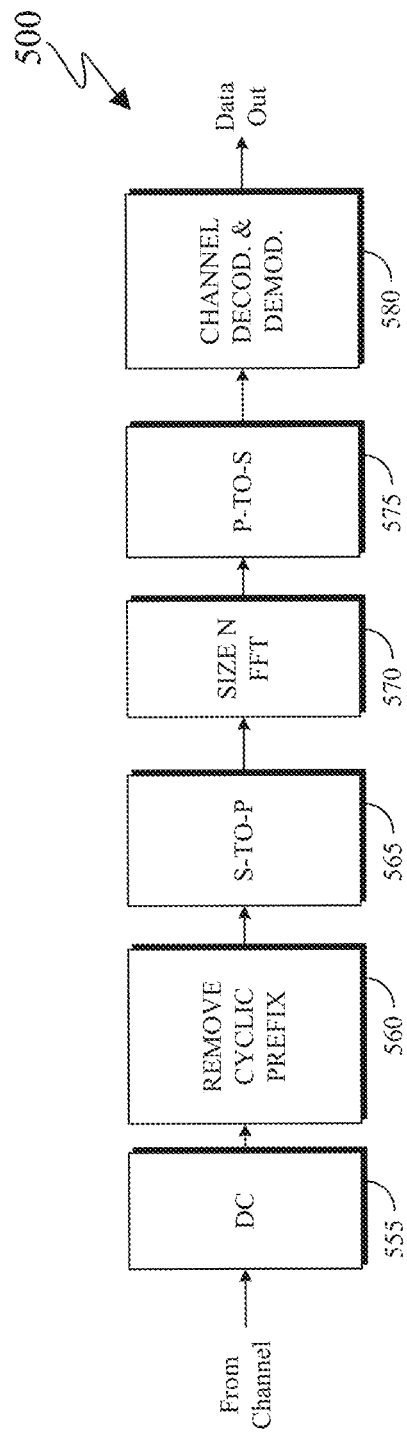

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support same power transmissions or receptions and, in various embodiments, DM-RS Filtering for TDD and FDD Modes as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In certain embodiments, a UE (such as the UE 116) includes a DM-RS in a physical uplink data channel (PUSCH) or in a physical uplink control channel (PUCCH) transmission in order to enable a receiver at a serving gNB (such as the BS 102) to coherently demodulate modulated data information symbols or control information symbols in the PUSCH or in the PUCCH, respectively. The DM-RS is typically located in the earlier symbols of a PUSCH or PUCCH transmission to avoid a demodulation delay due to a processing time for obtaining a channel estimate to be used for the coherent demodulation of data/control symbols under the assumption of phase coherence among the DM-RS and the data/control symbols.

Embodiments of the present disclosure take into consideration that inaccurate channel estimation can significantly degrade reception reliability of data/control information. A way to improve an accuracy of channel estimates is to filter multiple DM-RS across slots of an uplink transmission. In order to enable filtering over multiple DM-RS, a power and phase of the filtered DM-RS needs to remain practically same and that also applies to the power and phase of modulated data/control information symbols, for example in case of QAM modulation, in order to perform demodulation using the filtered DM-RS. Thus, when a UE (such as the UE 116) is scheduled to transmit a PUSCH with repetitions over a number of slots, the conditions that the UE should apply to maintain power consistency and phase continuity over a time period where the PUSCH repetitions are transmitted, include for the UE to not apply accumulated transmit power control (TPC) commands or for the UE to maintain a same precoding or spatial filter for the repetitions.

PUSCH repetitions can be transmitted in non-consecutive slots due to unavailability of time-frequency resources in some slots. For example, a slot may not include enough consecutive uplink (UL) symbols for a PUSCH or PUCCH repetition or may not be available for UL transmission by configuration or by means of a dynamic indication such as scheduling of a higher priority transmission, indication of a cancelation or indication of a slot as downlink (DL) slot. Depending on the number of slots or symbols between two consecutive repetitions, referred as the transmission gap, and on the number of consecutive repetitions within a time interval, the UE may or may not maintain power consistency and phase continuity for transmission of repetitions before the transmission gap, or after the transmission gap, or within a time interval that includes repetitions before the transmission gap, the transmission gap, and repetitions after the transmission gap.

Therefore, embodiments of the present disclosure take into consideration that there is a need to determine a time domain interval for DM-RS bundling in presence of transmission gaps. Embodiments of the present disclosure also take into consideration that there is another need to determine a transmit power for repetitions within a time domain interval for DM-RS bundling.

It is noted that although some descriptions consider a PUSCH transmission with repetitions in time domain windows, a same UE procedure can apply for a PUCCH transmission with repetitions in time domain windows.

Embodiments of the present disclosure describe a configuration and signaling for a time domain window. This is described in the following examples and embodiments, such as those of FIG. 6.

Figure 6:
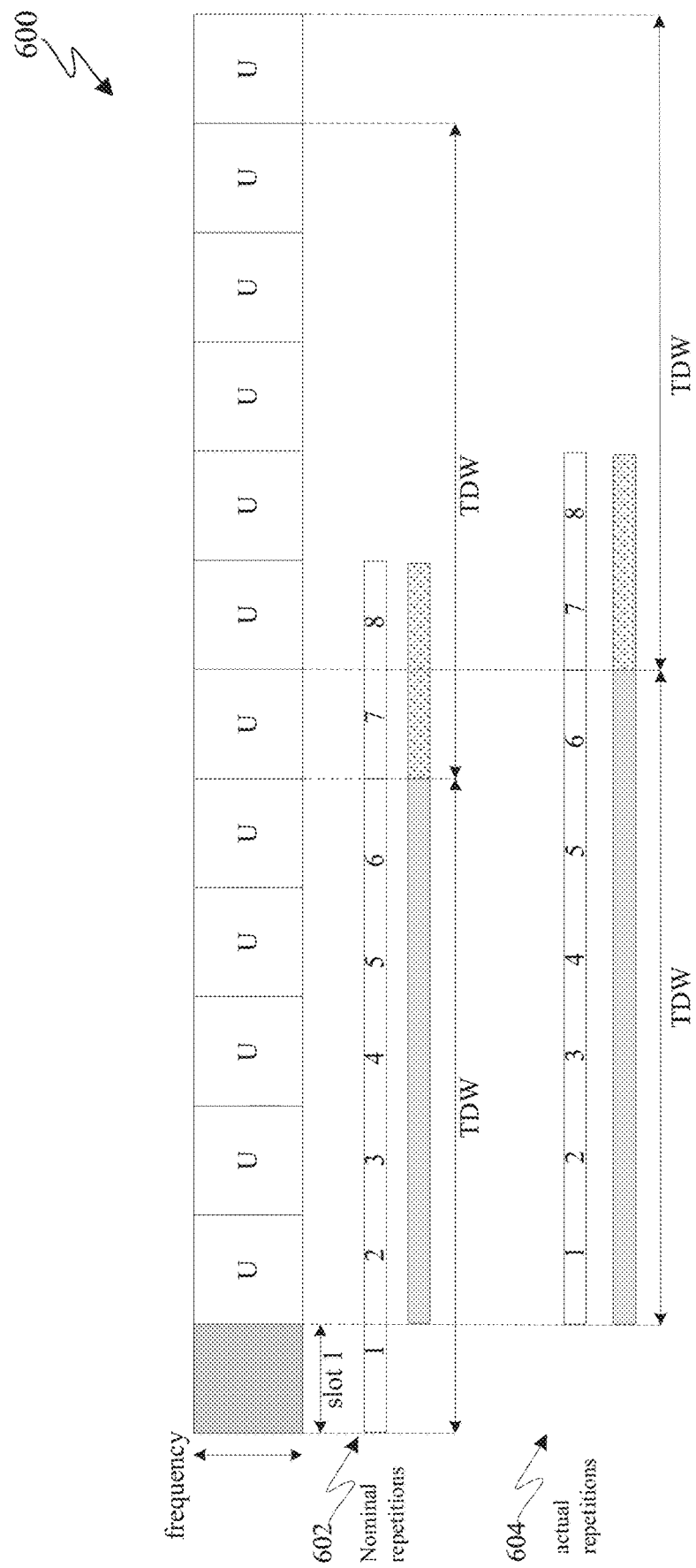
FIG. 6 illustrates example diagram of a time domain window (TDW) for operation with demodulation reference signal (DM-RS) bundling based on nominal and actual repetitions of a physical uplink control channel (PUCCH) or physical uplink shared channel (PUSCH) transmission according to embodiments of the present disclosure.

FIG. 6 illustrates example diagram 600 of a time domain window (TDW) based on nominal and actual repetitions of a PUCCH or PUSCH transmission according to embodiments of the present disclosure. FIG. 6 is for illustration only and other embodiments can be used without departing from the scope of the present disclosure. Although FIG. 6 illustrates various slot configurations, various changes may be made to FIG. 6.

In certain embodiments, when a gNB (such as the BS 102) configures a UE for operation with DM-RS bundling, the gNB can signal a TDW to the UE by indicating a time period, such as a number of slots, or by indicating a number of repetitions of a PUSCH or PUCCH transmission over which the UE should apply conditions that result to a continuous phase and a same power for the repetitions over the time period or over the number of repetitions. The length L of the time domain window can be configured or can be indicated by a downlink control information (DCI) format or can be derived from a configuration provided by higher layer parameters and an indication in a DCI format, for example a DCI format scheduling a PUSCH or PUCCH transmission with a number of repetitions. For example, a UE is configured a TDW length of L consecutive slots and is scheduled/configured for transmission of PUSCH or PUCCH with $N_{REP}$ repetitions. If the $N_{REP}$ repetitions are over a number of slots that exceeds the length L of the TDW, repetitions within a first TDW of length L would be transmitted with a first transmit power, repetitions over a second TDW, wherein the first and second TDWs are consecutive time intervals, would be transmitted with a second transmit power, and other repetitions, if present in subsequent TDWs, with other transmit powers. In another example the TDW length L can be a UE capability that is indicated to a serving gNB. When a TDW is not provided, the UE can determine the TDW to include all consecutive slots before the UE performs frequency hopping, or applies a TPC command, or changes a spatial filter for subsequent repetitions of a PUSCH or PUCCH transmission.

In certain embodiments, when a UE (such as the UE 116) is configured for operation with DM-RS bundling, the UE can also be configured an offset that indicates the position of a first slot of a first TDW. For example, both a starting slot (or an offset) and a length (or periodicity) of the time domain window can be provided by higher layer parameters. An RRC parameter, for example PUSCH-DMRS-Bundling or PUCCH-DMRS-Bundling, can indicate whether DM-RS bundling operation is enabled or disabled. Another RRC parameter, for example PUSCH-TimeDomainWindowLength or PUCCH-TimeDomainWindowLength, can indicate a TDW length. Another RRC parameter, for example PUSCH-TimeDomainWindowOffset or PUCCH-TimeDomainWindowOffset, can indicate an offset. It is possible that the RRC parameter that indicates the TDW length, if provided, also serves to indicate that DM-RS bundling is activated with the configured TDW length. It is also possible that a TDW configuration is same for PUSCH and PUCCH transmission and provided by UL-DMRS-Bundling and/or UL-TimeDomainWindowLength and/or UL-TimeDomainWindowOffset.

A start of a TDW can be associated with a nominal or an actual first repetition of a PUSCH or PUCCH transmission. In one example, when a UE (such as the UE 116) is configured/indicated a PUSCH or PUCCH transmission with repetitions, a first slot of a TDW can be the slot when the first nominal repetition is scheduled. In another example, the first slot of the GTW is the slot when the UE transmits the first actual PUSCH or PUCCH repetition.

FIG. 6 illustrates an example of a TDW based on nominal and actual repetitions of a PUCCH or PUSCH transmission according to the disclosure. A UE (such as the UE 116) is scheduled, by RRC or by a DCI format, a PUSCH transmission with eight (8) repetitions and the TDW length is six (6) slots. A first nominal repetition is scheduled in slot 1 that becomes unavailable for UL transmission, and a first actual repetition is transmitted in the next slot. In portion 602 the start of the TDW is associated with the first nominal repetition and in portion 604 the start of the TDW is associated with the first actual repetition. Thus, in portion 602 the UE transmits repetitions two (2) through six (6) in one TDW with a first power, or in first frequency resources, or with a first spatial filter, and transmits repetitions seven (7) and eight (8) in another TDW with a second power, or in second frequency resources, or with a second spatial filter, and in portion 604 the UE transmits repetitions one (1) to six (6) in one TDW with a first power, or in first frequency resources, or with a first spatial filter, and repetitions seven (7) and eight (8) in another TDW with a second power, or in second frequency resources, or with a second spatial filter.

Activation of DM-RS bundling and length of TDW can be configured per UL bandwidth part (BWP) as a TDW over which a UE is expected to transmit with a same power, continuous phase, and same spatial filter is defined for the UE to transmit on same frequency resources and over a single frequency hop, if frequency hopping is enabled. When the UE can be configured by higher layers multiple UL BWPs and multiple DL BWPs, and one or more UL BWP and one or more DL BWP can be active at any given time, activation of DM-RS bundling and length of TDW can be configured per multiple BWPs.

In certain embodiments, a UE (such as the UE 116) can operate in both TDD and FDD modes and can be configured for operation with DM-RS bundling in both modes. A UE can also operate in HD-FDD mode and be configured for operation with DM-RS bundling. Similar to TDD, an HD-FDD UE cannot transmit and receive at the same time and within a TDW the UE transmits with a same power, continuous phase, and same spatial filter to enable DM-RS filtering over multiple DM-RS receptions at a serving gNB.

Embodiments of the present disclosure also describe unavailable slots for UL transmission within a TDW. This is described in the following examples and embodiments, such as those of FIG. 7.

Figure 7:
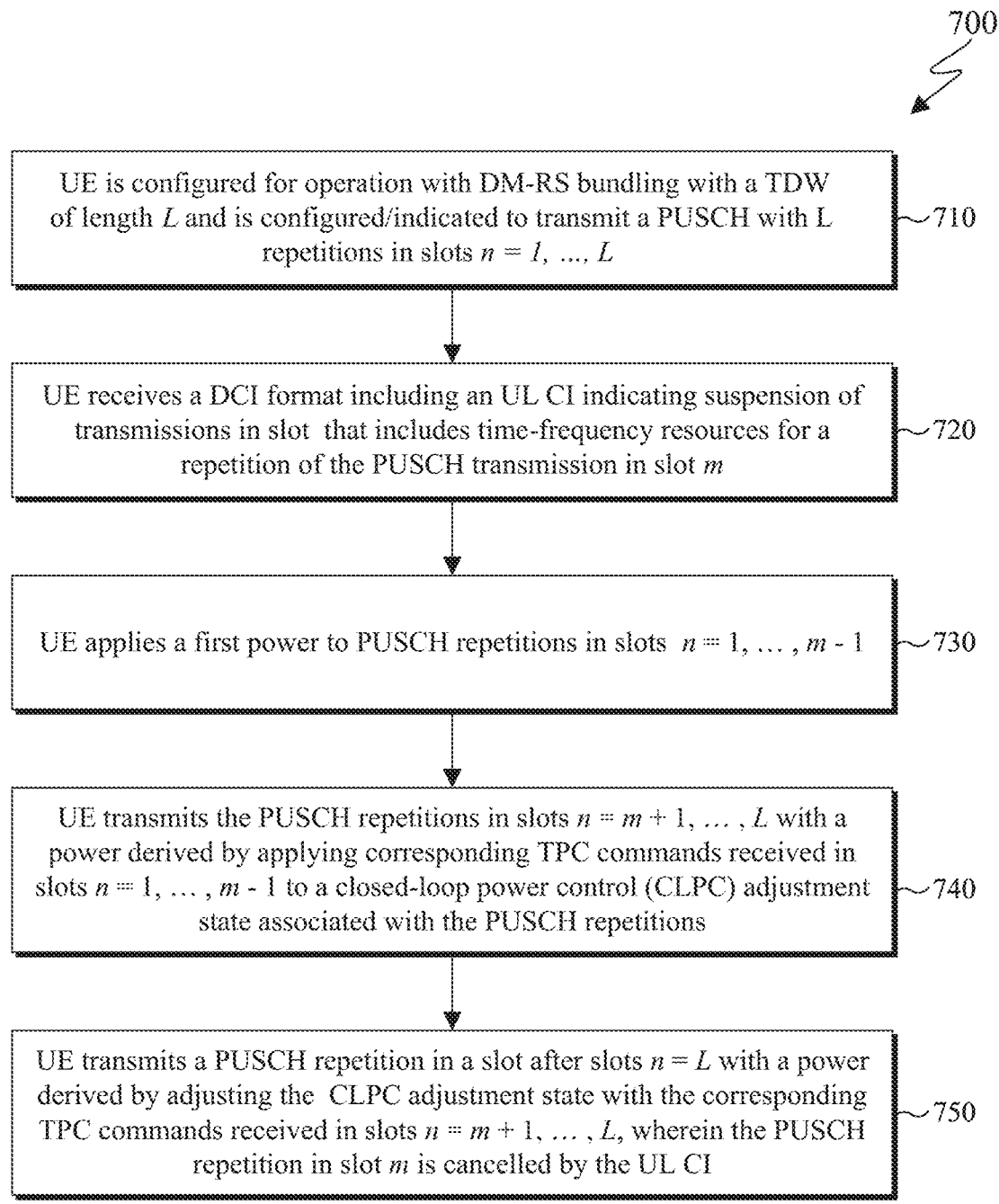
FIG. 7 illustrates an example method of a UE determining a power for PUSCH repetitions according to embodiments of the present disclosure.

FIG. 7 illustrates an example method 700 of a UE determining a power for PUSCH repetitions according to embodiments of the present disclosure. The steps of the method 700 of FIG. 7 can be performed by any of the UEs 111-116 of FIG. 1, such as the UE 116 of FIG. 3. The method 700 is for illustration only and other embodiments can be used without departing from the scope of the present disclosure.

In certain embodiments, a UE (such as the UE 116) can be provided an UL-DL slot configuration by tdd-UL-DL-ConfigurationCommon over a number of slots and can be additionally provided tdd-UL-DL-ConfigurationDedicated that overrides only flexible symbols per slot over the number of slots as provided by tdd-UL-DL-ConfigurationCommon. Additionally, the UL-DL slot configuration can be determined by considering an overlap with symbols corresponding to a reception of Synchronization Signal (SS) physical broadcast channel (PBCH) (also denoted as SS/PBCH) blocks in slots with candidate SS/PBCH block indices as provided to a UE by ssb-PositionsInBurst in SIB1, or by ssb-PositionsInBurst in ServingCellConfigCommon, or an overlap with symbols corresponding to a reception of a control resource set (CORESET) denoted as CORESET0 with Type0-PDCCH common search space (CSS) that are unavailable for UL transmission.

When a UE (such as the UE 116) is configured for operation with DM-RS bundling and with a TDW of length L, it is possible that some of the L consecutive slots of the TDW are not available for uplink transmission. A gNB (such as the BS 102) can schedule a PUSCH or PUCCH transmission with repetitions over a number of consecutive slots, wherein some of the slots are DL slots or generally not available for PUSCH or PUCCH transmission. Alternatively, a gNB (such as the BS 102) can schedule a PUSCH or PUCCH transmission with repetitions in available UL slots. The UE would transmit PUSCH repetitions within a first TDW of length L with a first power, frequency resources, and spatial filter and transmit PUSCH repetitions in a second TDW with a second power, frequency resources, and spatial filter.

When a gNB (such as the BS 102) configures a UE (such as the UE 116) for operation with DM-RS bundling and schedules a PUSCH or PUCCH transmission with repetitions, a slot can be unavailable for transmission of a PUSCH repetition due to an overlap with another transmission of larger priority, or due to a PUSCH or PUCCH repetition being canceled by a DCI format providing an uplink cancelation indicator (CI), or due to a number of symbols in a slot, that are indicated by an slot format indication (SFI)-index field value in a DCI format 2_0, being less than a number of symbols for a PUSCH repetition. When one or more slots in a TDW are unavailable for UL transmission, PUSCH or PUCCH repetitions in the available slots of a TDW using DM-RS bundling can depend on a number of consecutive slots that are unavailable and on a number of consecutive slots that are available. A UE can also be configured whether to use or not DM-RS bundling in a TDW after a first DM-RS bundling operation is interrupted and a transmission gap exists. When DM-RS bundling is used after a transmission gap in a TDW, a start of a new DM-RS bundle may not be possible in a next slot after the transmission gap, and a timing offset is added after the transmission gap, wherein the timing offset can be configured by gNB and can additionally be indicated by the UE as a capability. The new DM-RS bundle would include repetitions starting from the slot after the transmission gap and the timing offset.

In the following example, a slot in a TDW is unavailable and the UE is configured with DM-RS bundling. The UE applies a same power, frequency resource, and spatial filter to PUSCH repetitions over a number of slots before the unavailable slots, and after the unavailable slot, the UE transmits PUSCH repetitions by applying corresponding TPC commands that the UE received over the number of slots. Whether to apply DM-RS bundling over all repetitions in the TDW, or only over the repetitions before the unavailable slot, or only over the repetitions after the unavailable slot, can be subject to conditions.

The method 700 as illustrated in FIG. 7 describes an example procedure for a UE to determine a power for PUSCH repetitions according to the disclosure.

In step 710, a UE (such as the UE 116) is configured for operation with DM-RS bundling with a TDW of length L and is configured/indicated to transmit a PUSCH with L repetitions in slots n=1, . . . , L. In step 720, the UE receives a DCI format including an UL CI indicating suspension of transmissions in slot m that includes time-frequency resources for a repetition of the PUSCH transmission in slot m. In step 730, the UE applies a first power to PUSCH repetitions in slots n=1, . . . , m−1. In step 740, the UE transmits the PUSCH repetitions in slots n=m+1, . . . , L with a power derived by applying corresponding TPC commands received in slots n=1, . . . , m−1 to a closed-loop power control (CLPC) adjustment state associated with the PUSCH repetitions. In step 750, the UE transmits a PUSCH repetition in a slot after slot n=L with a power derived by adjusting the CLPC adjustment state with the corresponding TPC commands received in slots n=m+1, . . . , L, wherein the PUSCH repetition in slot m is canceled by the UL CI.

It is also possible that one or more slots within a TDW become unavailable due to scheduling of another PUSCH transmission. For example, a UE is configured for operation with DM-RS bundling with a TDW of length L and is configured/indicated to transmit a first PUSCH with L repetitions in slots n=1, . . . , L. The UE receives a DCI format that schedules a second PUSCH transmission in slot i with 1<i<L. If the second PUSCH transmission is prioritized over the first PUSCH transmission, the UE interrupts the transmission of the first PUSCH repetitions with DM-RS bundling and transmits the second PUSCH in slot i. Whether the remaining repetitions of the first PUSCH transmission after slot i are transmitted using DM-RS bundling can be subject to a configuration and/or a UE capability. The transmit power of the remaining PUSCH repetitions can depend on TPC commands received before slot i and/or received up to slot i, and on whether DM-RS bundling restarts after the interruption due to the scheduling of the second PUSCH. It is also possible that the scheduling of the second PUSCH is for more than one slot. Alternatively, reception of the DCI format scheduling the second PUSCH is not an event that interrupts the transmission of the first PUSCH repetitions with DM-RS bundling, and the scheduling of the second PUSCH transmission is ignored by the UE that completes the transmission of the L repetitions in slots n=1, . . . , L by applying a same power for transmission of the first PUSCH repetitions. The accumulation of the TPC commands during the time domain window can also be affected by the TPC command, if any, received in slot i in a DCI format scheduling the second PUSCH.

Although FIG. 7 illustrates the method 700 various changes may be made to FIG. 7. For example, while the method 700 is shown as a series of steps, various steps could overlap, occur in parallel, occur in a different order, or occur multiple times. In another example, steps may be omitted or replaced by other steps. For example, steps of the method 700 can be executed in a different order.

Embodiments of the present disclosure further describe determining DM-RS bundling based on a configured maximum transmission gap and/or a minimum DM-RS bundle size. This is described in the following examples and embodiments, such as those of FIGS. 8-10.

Figure 8:
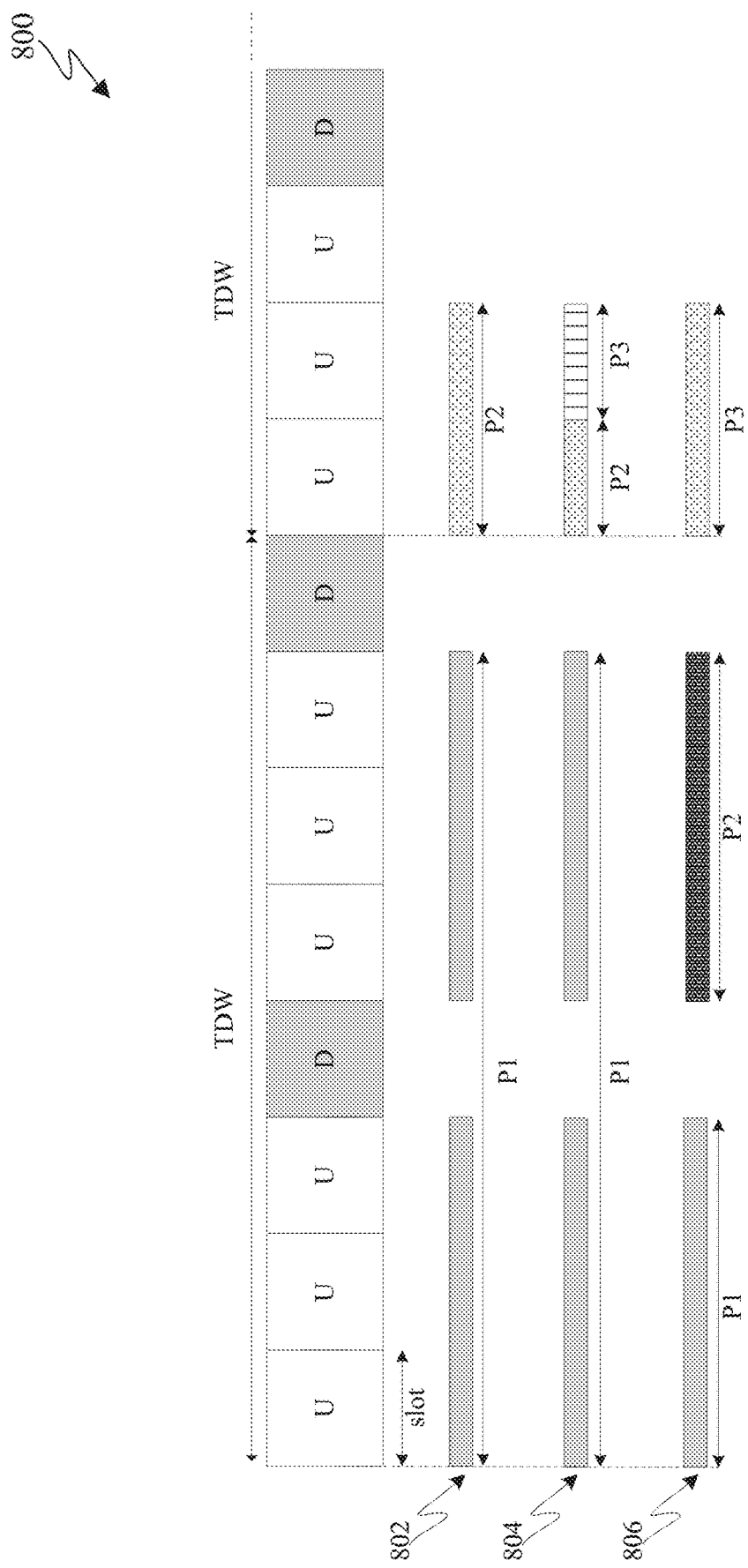
FIG. 8 illustrates an example diagram of transmit power values for operation with DM-RS bundling according to embodiments of the present disclosure.
Figure 9:
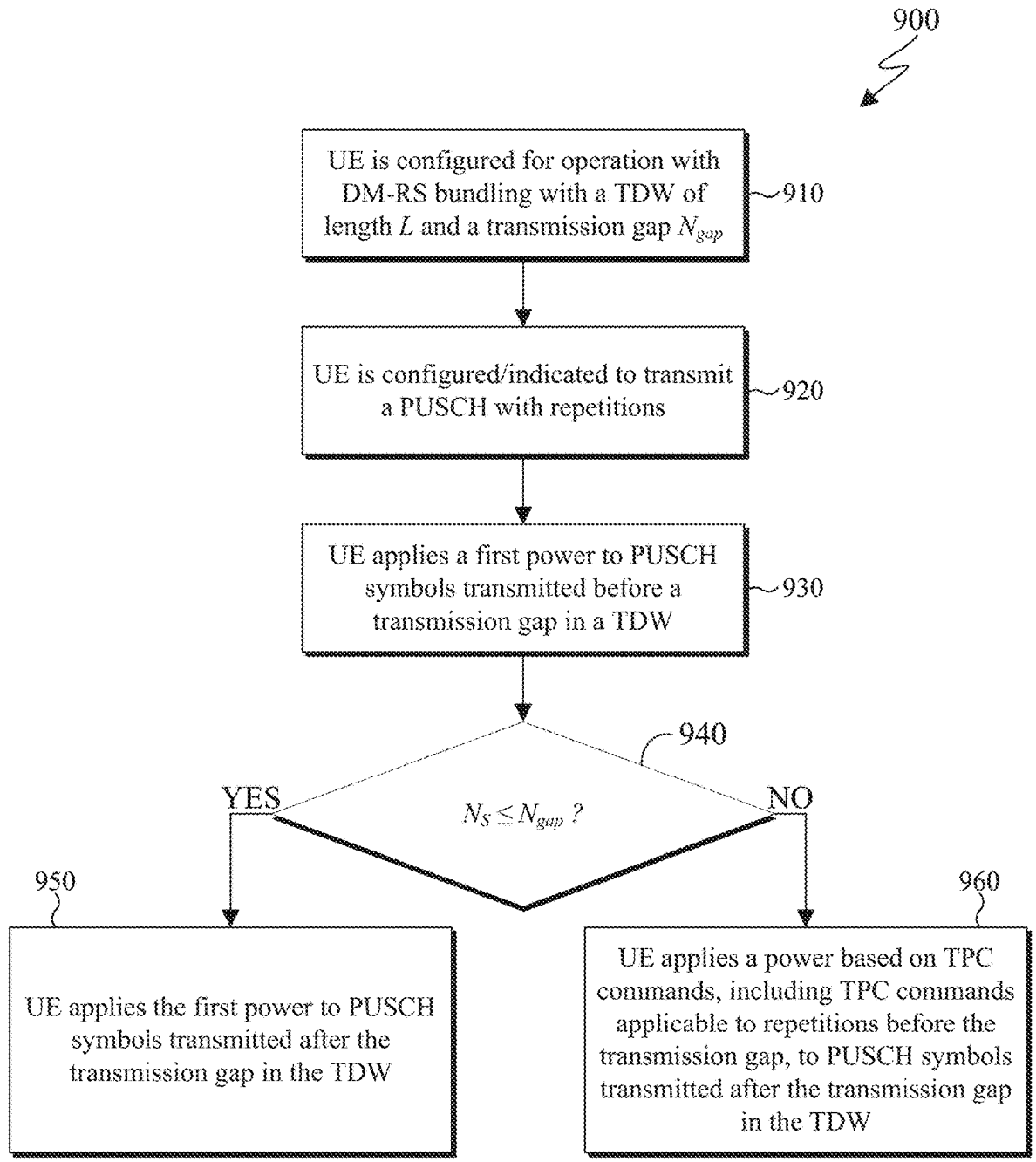
FIG. 9 illustrates an example method of a UE determining a power for a PUSCH transmission with repetitions according to embodiments of the present disclosure.
Figure 10:
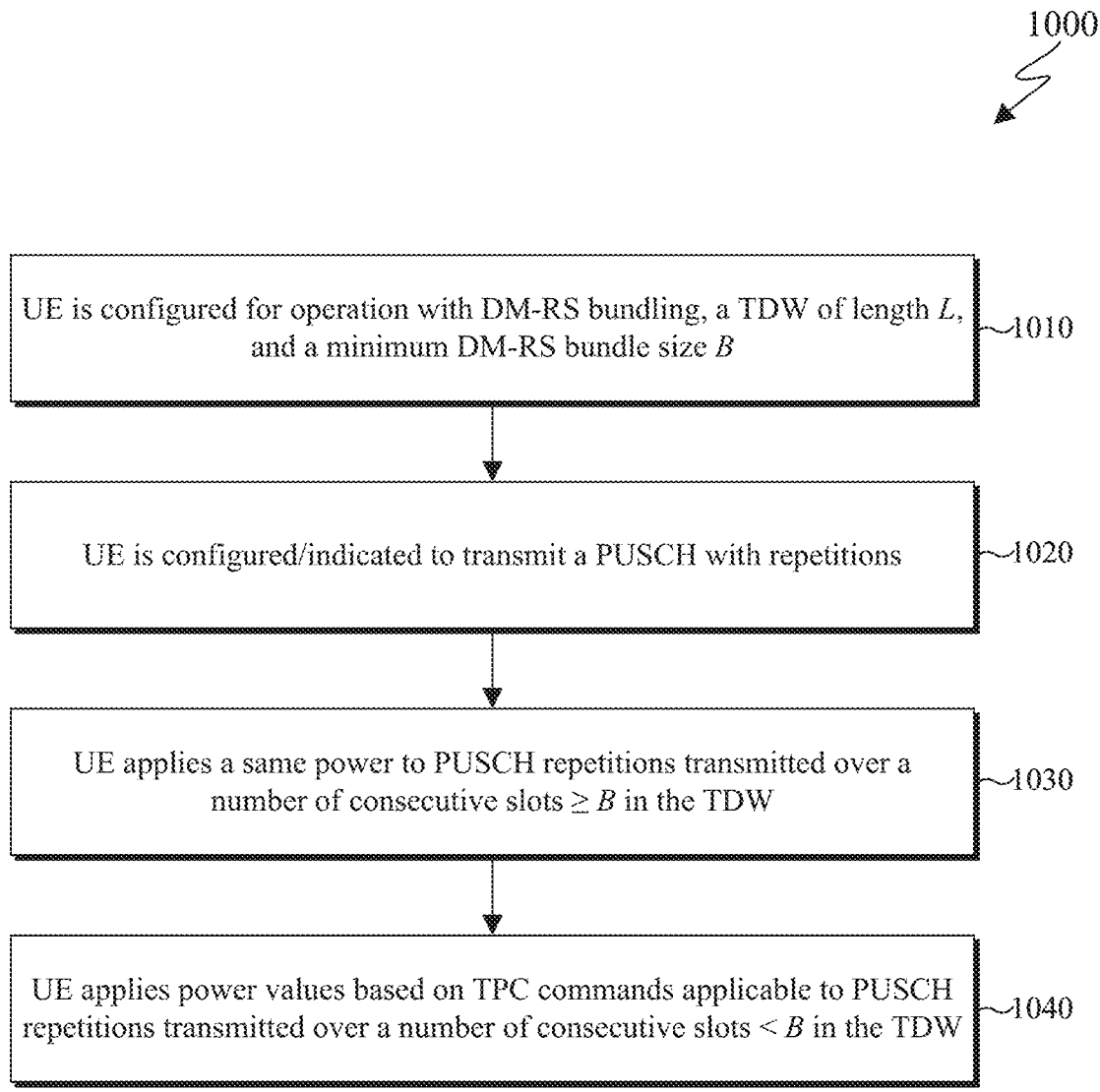
FIG. 10 illustrates an example method of a UE determining a power for a PUSCH transmission with repetitions based on a configured minimum bundle size according to embodiments of the present disclosure.

FIG. 8 illustrates an example diagram 800 of transmit power values for operation with DM-RS bundling according to embodiments of the present disclosure. FIG. 9 illustrates an example method 900 of a UE determining a power for a PUSCH transmission with repetitions according to embodiments of the present disclosure. FIG. 10 illustrates an example method 1000 of a UE determining a power for a PUSCH transmission with repetitions based on a configured minimum bundle size according to embodiments of the present disclosure. The steps of the method 900 of FIG. 9 and the method 1000 of FIG. 10 can be performed by any of the UEs 111-116 of FIG. 1, such as the UE 116 of FIG. 3. The methods 900 and 1000 and the diagram of FIG. 8 are for illustration only and other embodiments can be used without departing from the scope of the present disclosure.

In certain embodiments, when a UE (such as the UE 116) is configured with DM-RS bundling and all slots of a TDW are available for UL transmission, the UE updates but does not apply a CLPC adjustment state in the TDW based on TPC commands that are applicable to slots of the TDW in order to maintain a same power for all repetitions of a PUSCH or a PUCCH transmission in the TDW. The UE updates a power for repetitions of the PUSCH or PUCCH transmission at the beginning of a TDW based on a value of the updated CLPC adjustment state at the beginning of the TDW. Alternatively, a CLPC adjustment state of a first TDW is used in a second TDW, wherein first and second TDWs can be consecutive TDWs, or can be separated by a number of slots or symbols, wherein the UE does not consider TPC commands applicable for slots of the first TDW or of the second TDW. It is also possible that, in a first TDW the UE transmits repetitions with a first power that is determined based on a CLPC adjustment state, and in a second TDW the UE transmits repetitions with a second power that is not updated based on the CLPC adjustment state of the first TDW. When there are unavailable slots for UL transmission in a TDW, DM-RS bundling may apply only to some of the available slots.

The diagram 800 as illustrated in FIG. 8 describes examples of transmit power values for operation with DM-RS bundling according to the disclosure.

In the example of FIG. 8, a UE (such as the UE 116) is configured/indicated a PUSCH transmission with eight (8) repetitions and a TDW length of eight (8) slots. Slots four (4), eight (8), and twelve (12) are unavailable for UL transmission. In portion 802, the UE transmits the first 6 repetitions in the first TDW with a power $P_1$ and transmits the remaining two (2) repetitions in the second TDW with a power $P_2$. In portion 804, the UE transmits the first 6 repetitions in the first TDW with power $P_1$ and transmits the remaining two (2) repetitions in the second TDW with corresponding power values $P_2$ and $P_3$ based on TPC commands. In portion 806, the UE transmits only repetitions in consecutive physical slots within a TDW with a same power. The UE transmits the first three (3) repetitions in consecutive slots in the first TDW with power $P_1$ and transmits the second three (3) repetitions in consecutive slots in the first TDW with power $P_2$. The UE transmits the last two (2) repetitions in consecutive slots in the second TDW with power $P_3$.

The applicability of portions 802 or 806 may depend on the length of the transmission gap between two consecutive repetitions. In the example of FIG. 8, the transmission gap within the first TDW is the number of symbols between the last PUSCH or PUCCH symbol of the repetition in slot three (3) and the first PUSCH or PUCCH symbol of the repetition in slot five (5). For example, assuming that the PUSCH repetition in slot three (3) occupies up to the last symbol of the slot and that the PUSCH repetition in slot five (5) starts from the first symbol of the slot, the resulting gap is fourteen (14) symbols. When a gNB configures the maximum transmission gap for applying DM-RS bundling to slots before and after the transmission gap not to exceed fourteen (14) symbols, the UE applies transmit powers in the first TDW as in portion 802 (or equivalently as in portion 804) where slots before and after the transmission gap are included in the same DM-RS bundle. When a gNB configures the maximum transmission gap to be less than fourteen (14) symbols, the UE applies transmit powers as in portion 806 where a DM-RS bundle is used for slots before the transmission gap and another DM-RS bundle is used for slots after the transmission gap. A DM-RS bundle can have a same size as a TDW when all slots of the TDW are available for UL transmission and PUSCH or PUCCH repetitions are transmitted in all slots of the TDW.

Thus, when a UE is configured for operation with DM-RS bundling, a TDW over which the UE maintains a same power, continuous phase and same spatial filter, can include a number of symbols between two consecutive repetitions where no PUSCH or PUCCH transmission occurs if the number of symbols does not exceed a value $N_{gap}$, which can be a fixed value, or can be a UE capability that is indicated to a serving gNB, or can be configured by higher layers. When the transmission gap between two consecutive repetitions exceeds $N_{gap}$, a same DM-RS bundle over which the UE maintains a same power, continuous phase and same spatial filter for repetitions does not include repetitions before and after the transmission gap. For example when a UE is scheduled/configured with a number of PUSCH or PUCCH repetitions in a number of slots, and is configured with DM-RS bundling with a TDW of L slots, and the TDW includes a transmission gap of a number of symbols less than or equal to $N_{gap}$, the UE maintains a same power, continuous phase and same spatial filter over the PUSCH or PUCCH transmission within the TDW of length L. When the transmission gap is larger than $N_{gap}$, the UE applies a first DM-RS bundling of repetitions before the gap and a second DM-RS bundling of the repetitions after the transmission gap. It is possible that a UE is also configured to apply a DM-RS bundling over a number of slots if the number of slots in a DM-RS bundle is larger than a minimum number of slots, for example 2 slots, or if the DM-RS bundle includes at least 2 slots with DM-RS symbols. When the condition of minimum bundle size is not satisfied, the UE transmits each PUSCH or PUCCH repetition by applying a power derived from a CLPC adjustment state with the accumulated TPC command values or changing a precoding or a spatial filter.

The method 900, as illustrated in FIG. 9 describes an example procedure for a UE to determine a power for a PUSCH transmission with repetitions according to the disclosure.

In step 910, a UE (such as the UE 116) is configured for operation with DM-RS bundling and a TDW of length L and a transmission gap $N_{gap}$. In step 920, the UE is configured/indicated to transmit a PUSCH with repetitions. In step 930, the UE applies a first power to PUSCH symbols transmitted before a transmission gap in a TDW. In step 940, the UE determines whether a transmission gap includes a number of consecutive symbols $N_s$ smaller than or equal to $N_{gap}$. When $N_s \leq N_{gap}$ (as determined in step 940), the UE in step 950 applies the first power to PUSCH symbols transmitted after the transmission gap in the TDW. When $N_s > N_{gap}$ (as determined in step 940), the UE in step 960 applies a power based on TPC commands, including TPC commands applicable to repetitions before the transmission gap, to PUSCH symbols transmitted after the transmission gap in the TDW. Alternatively in step 960, the UE can apply a power based on TPC commands, not including TPC commands applicable to repetitions before the transmission gap, to PUSCH symbols transmitted after the transmission gap in the TDW.

The method 1000, as illustrated in FIG. 10 describes an example procedure for a UE to determine a power for a PUSCH transmission with repetitions based on a configured minimum bundle size according to the disclosure.

In step 1010, a UE (such as the UE 116) is configured for operation with DM-RS bundling, a TDW of length L, and a minimum DM-RS bundle size B. In step 1020, the UE is configured/indicated to transmit a PUSCH with repetitions. In step 1030, the UE applies a same power to PUSCH repetitions transmitted over a number of consecutive slots≥B in the TDW. In step 1040, the UE applies power values based on TPC commands applicable to PUSCH repetitions transmitted over a number of consecutive slots<B in the TDW.

Although FIG. 8 illustrates an example slot configurations, FIG. 9 illustrates the method 900, and FIG. 10 illustrates the method 1000 various changes may be made to FIGS. 8-10. For example, while the methods 900 and 1000 are shown as a series of steps, various steps could overlap, occur in parallel, occur in a different order, or occur multiple times. In another example, steps may be omitted or replaced by other steps. For example, steps of the method 900 and the method 1000 can be executed in a different order.

Additionally, embodiments of the present disclosure describe determining a transmit power in a TDW. This is described in the following examples and embodiments, such as those of FIGS. 11-13.

Figure 11:
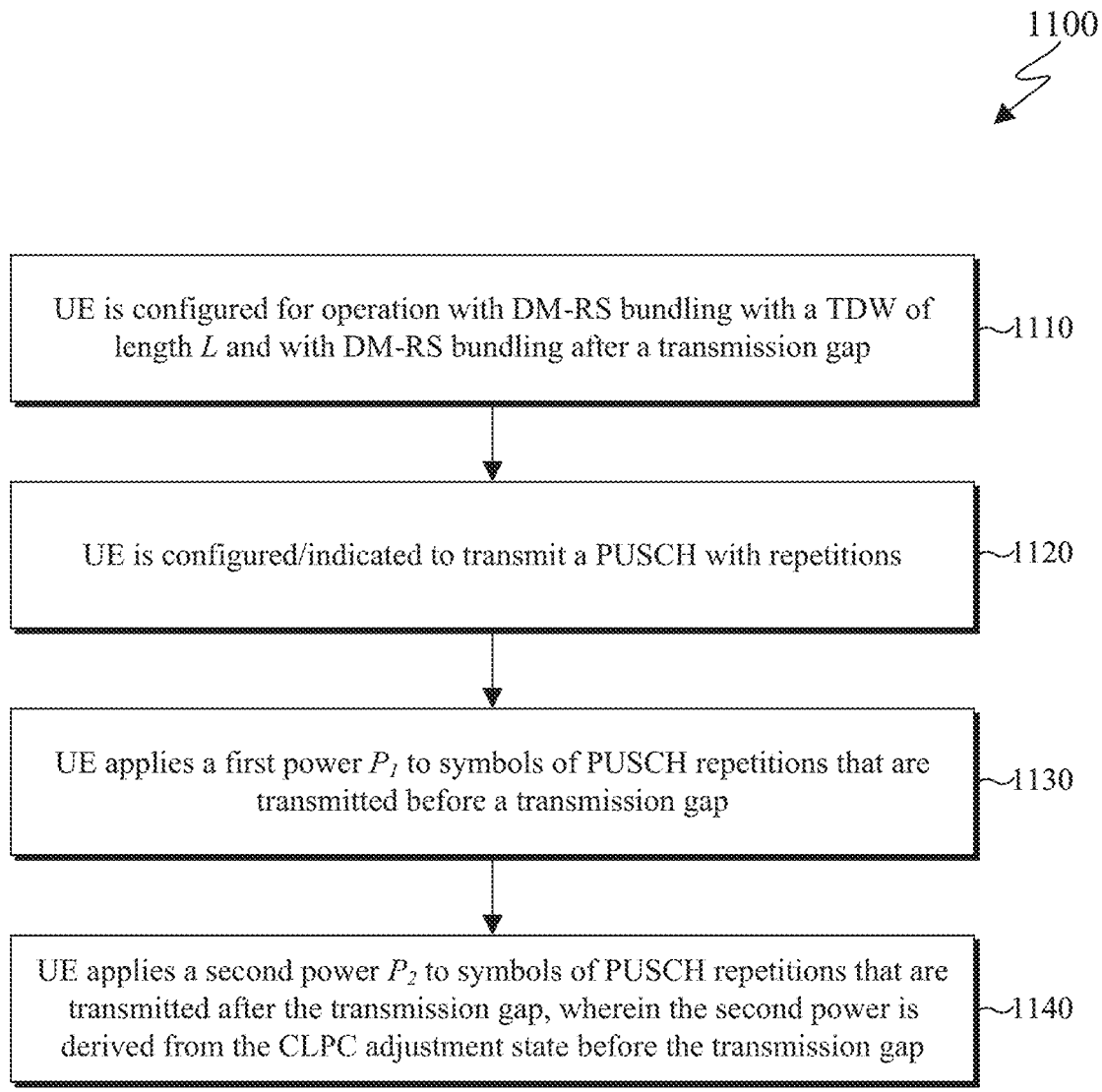
FIG. 11 illustrates an example method of a UE determining a power for a PUSCH transmission when a UE is configured with resuming of DM-RS bundling operation after a transmission gap in the same TDW of the transmission gap according to embodiments of the present disclosure.
Figure 12:
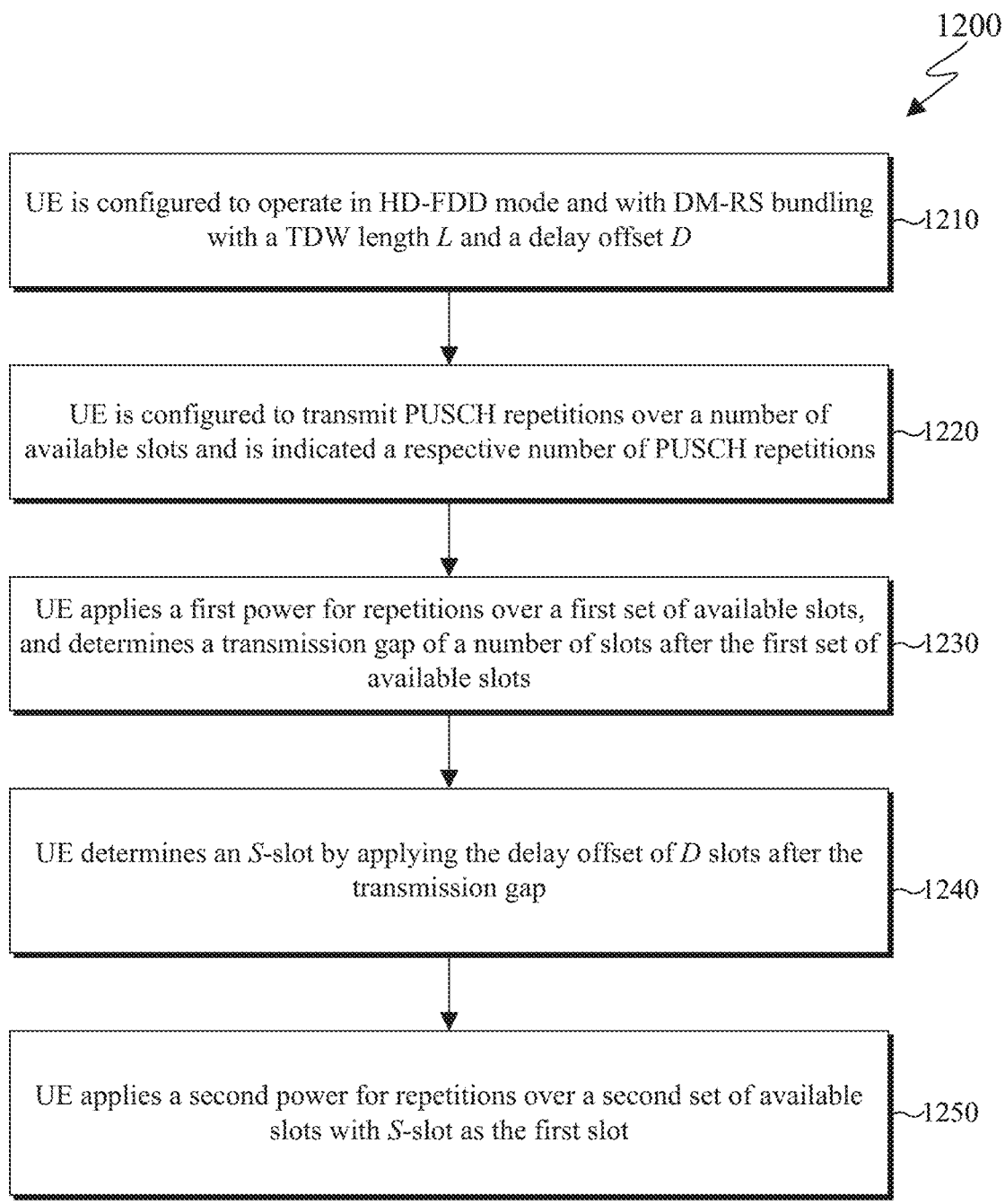
FIG. 12 illustrates an example method of a half-duplex frequency division duplex (HD-FDD) UE to determine a power for a PUSCH transmission according to embodiments of the present disclosure.
Figure 13:
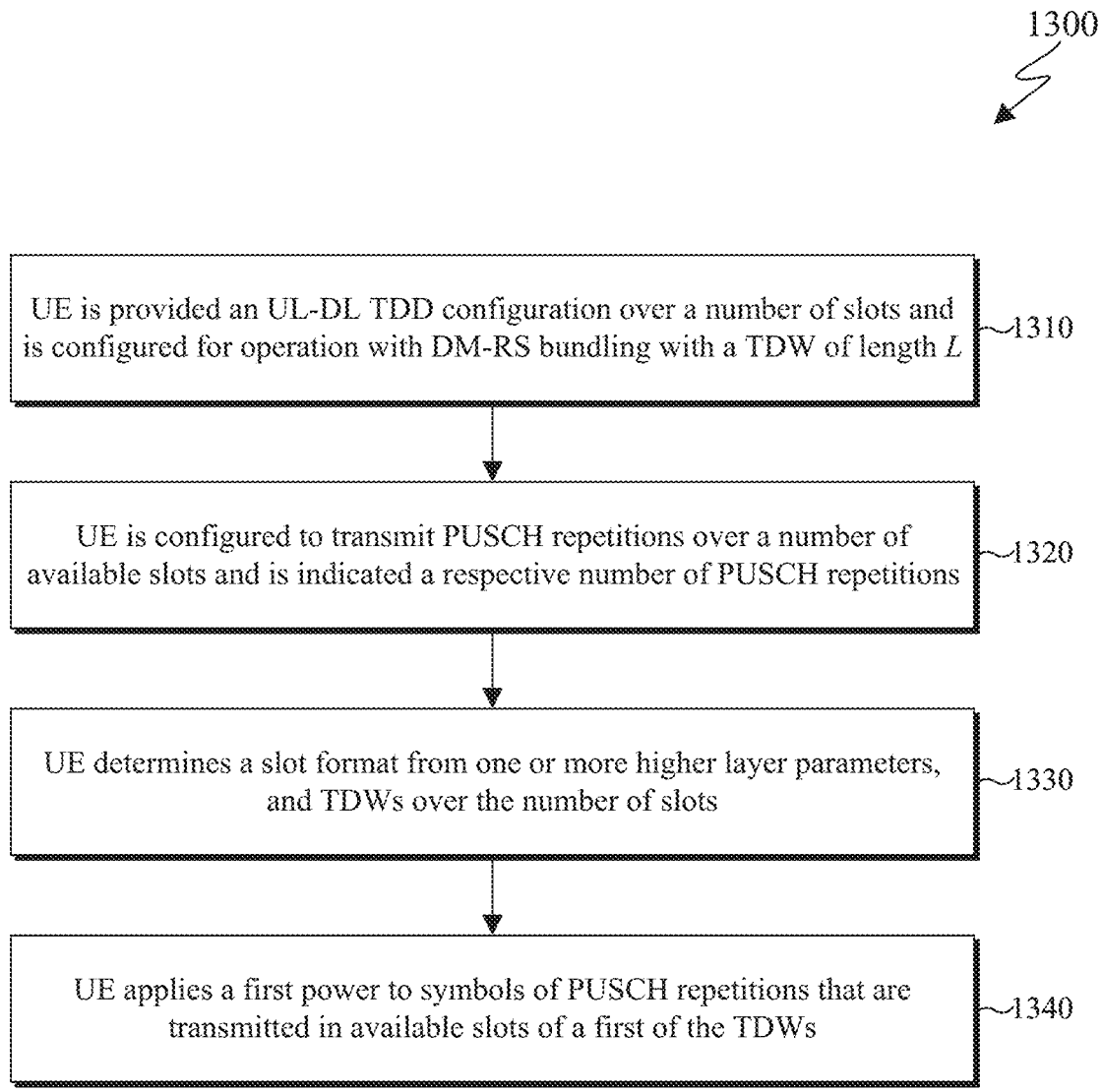
FIG. 13 illustrates an example method of a UE determining a power for a PUSCH transmission when the UE is configured with counting repetitions based on available slots according to embodiments of the present disclosure.

FIG. 11 illustrates an example method 1100 of a UE determining a power for a PUSCH transmission when a UE is configured with resuming of DM-RS bundling operation after a transmission gap in the same TDW of the transmission gap according to embodiments of the present disclosure. FIG. 12 illustrates an example method 1200 of a HD-FDD UE to determine a power for a PUSCH transmission according to embodiments of the present disclosure. FIG. 13 illustrates an example method 1300 of a UE determining a power for a PUSCH transmission when the UE is configured with counting repetitions based on available slots according to embodiments of the present disclosure. The steps of the method 1100 of FIG. 11, the method 1200 of FIG. 12, and the method 1300 of FIG. 13 can be performed by any of the UEs 111-116 of FIG. 1, such as the UE 116 of FIG. 3. The methods 1100-1300 are for illustration only and other embodiments can be used without departing from the scope of the present disclosure.

In certain embodiments, DM-RS bundling is not used after a transmission gap in a TDW where the transmission gap occurs. A transmit power of PUSCH symbols after a transmission gap in a TDW can be based on a corresponding CLPC adjustment state.

For a first example, the CLPC adjustment state can be based on accumulated TPC commands, when any, applicable during the transmission of the PUSCH symbols before the transmission gap, and a TPC command, when any, applicable for the first PUSCH symbol after the transmission gap. For a second example, the CLPC adjustment state can be based on accumulated TPC commands, when any, applicable during the transmission of the PUSCH symbols before the transmission gap, and not on a TPC command, when any, applicable for the first PUSCH symbol after the transmission gap. For a third example, the CLPC adjustment state can be based on TPC command applicable for the first PUSCH symbol after the transmission gap without including TPC commands applicable for the PUSCH symbols in the TDW before the transmission gap. For a fourth example, the CLPC adjustment state can be based on accumulated TPC commands, when any, applicable during the transmission of the PUSCH symbols before the transmission gap, and TPC commands, when any, applicable during the transmission gap.

Whether any of the four examples are used can depend on the length of the transmission gap. It is also possible that a gNB configures the UE for updating the transmit power of PUSCH symbols based on any of the above four examples. A default UE behavior can be, for example, the third example, unless the UE is configured for updating the power for the repetitions of the PUSCH transmission after a transmission gap. It is also possible that the default behavior is first or second example. A combination of elements in the above cases is also possible, such as the first and fourth examples. When the first and fourth examples are combined, transmit power of PUSCH symbols after a transmission gap in a TDW can be based on accumulated TPC commands, when any, applicable during the transmission of the PUSCH symbols before the transmission gap, TPC commands, when any, applicable during the transmission gap, and TPC command applicable for the first PUSCH symbol after the transmission gap.

In certain embodiments, DM-RS bundling is used after a transmission gap in the TDW where the transmission gap occurs. A UE transmits PUSCH repetitions after the transmission gap in a TDW with a same power, continuous phase and same spatial filter, and applies accumulated TPC commands prior to the transmission gap for repetitions after the transmission gap. The CLPC adjustment state corresponding to the first PUSCH symbol after the transmission gap determines the power used for the PUSCH repetitions after the transmission gap. The CLPC adjustment state corresponding to the first PUSCH symbol after the transmission gap can be based on (i) accumulated TPC commands applicable before the transmission gap, and a TPC command applicable for the first PUSCH symbol after the transmission gap, (ii) accumulated TPC commands applicable before the transmission gap, and not on a TPC command applicable for the first PUSCH symbol after the transmission gap, (iii) a TPC command applicable for the first PUSCH symbol after the transmission gap and does not include accumulated TPC commands that are applicable before the transmission gap, or (iv) accumulated TPC commands, when any, applicable during the transmission of the PUSCH symbols before the transmission gap, and TPC commands, when any, applicable during the transmission gap.

Whether the above four examples are used can depend on the length of the transmission gap. It is also possible that a gNB configures the UE for updating the transmit power of PUSCH symbols based on the above four examples. A default UE behavior can be, for example, (iii) unless the UE is configured for updating the transmit power after a transmission gap. It is also possible that the default behavior is (i) or (ii). A combination of elements in the above cases is also possible. For example (i)+(iv), wherein transmit power of PUSCH symbols after a transmission gap in a TDW can be based on accumulated TPC commands, when any, applicable during the transmission of the PUSCH symbols before the transmission gap, TPC commands, when any, applicable during the transmission gap, and TPC command applicable for the first PUSCH symbol after the transmission gap.

In certain embodiments, when a UE is configured with resuming of DM-RS bundling operation after a transmission gap in a same TDW as the transmission gap, the applicability of DM-RS bundling may be subject to other conditions such as for example a minimum number of slots in a DM-RS bundle, and the transmit power in the DM-RS bundle may be subject to other conditions such as for example a length of the transmission gap in number of symbols or slots. It is possible that the applicability of DM-RS bundling after the transmission gap is not subject to other conditions and if configured, the UE applies DM-RS bundling after a transmission gap using a same power, continuous phase, and same spatial filter, as before the transmission gap. Additionally or alternatively, the applicability of DM-RS bundling operation after a transmission gap in the TDW of the transmission gap and/or the corresponding transmit power may depend on whether the transmission gap is due to a slot format configuration by higher layers or is also determined by signaling via a DCI format. For example, for TDD operating mode, when the transmission gap is due to a slot being unavailable in an UL-DL TDD configuration, the UE uses DM-RS bundling after the transmission gap, while when the transmission gap is due to an overlap of a repetition with a transmission of higher priority or due to a reception of a DCI format including an UL CI indicating suspension of transmissions in time-frequency resources that include any time-frequency of a repetition, the UE does not apply DM-RS bundling to PUSCH or PUCCH repetitions after the transmission gap and determines transmit power values based on corresponding TPC commands that are applicable to repetitions after the transmission gap according to a respective CLPC accumulation state.

In certain embodiments, when a UE is configured for operation with DM-RS bundling with a TDW of length L and is configured/indicated to transmit a first PUSCH with L repetitions in slots n=1, . . . , L, the UE accumulates TPC commands received in a DCI format 2_2 with cyclic redundancy check (CRC) scrambled by TPC-PUSCH-Radio Network Temporary Identifier (RNTI) during the TDW, updates a corresponding closed-loop power control adjustment state and applies the updated state to determine a power of a first repetition (first transmission occasion) in a subsequent TDW. Repetitions after the first repetition within a TDW are transmitted with the same power as the first repetition. If a UE receives a DCI format scheduling a second PUSCH transmission in slot i, 1<i<L, wherein the DCI format includes a TPC command value, the reception of the DCI format can constitute an event that interrupts the DM-RS bundling of the first PUSCH transmission or may not constitute an event that interrupts the DM-RS bundling of the first PUSCH transmission.

In one embodiment when a reception of a DCI format scheduling a second PUSCH transmission in slot i constitute an event that interrupts a DM-RS bundling TDW of length L of a first PUSCH transmission, the UE transmits repetitions of the first PUSCH in the TDW until slot i−1 and transmits the second PUSCH in slot i according to the TPC command provided by the DCI format scheduling the second PUSCH. The power of the PUSCH repetition of the first PUSCH transmitted in slot i+1 is computed based on (i) the accumulated TPC commands in the previous DM-RS bundling TDW until slot i−1 and the TPC command received in a DCI format 2_2 with CRC scrambled by TPC-PUSCH-RNTI, if any, after i−1, or (ii) the accumulated TPC commands in the previous DM-RS bundling TDW until slot i−1, the TPC command included in the DCI format scheduling the second PUSCH and the TPC command received in a DCI format 2_2 with CRC scrambled by TPC-PUSCH-RNTI, if any, after i−1.

The UE may or may not restart DM-RS bundling of the remaining repetitions in slot i+1. Whether DM-RS bundling is restarted may depend on the slot where the second PUSCH transmission is scheduled, and/or on whether the second PUSCH is scheduled in one or more slots. The prioritization of the second PUSCH transmission respect to the first PUSCH transmission may depend on the slot where the second PUSCH transmission is scheduled, and/or on whether the second PUSCH is scheduled in one or more slots. The prioritization of the second PUSCH transmission respect to the first PUSCH transmission may depend on the PUSCH repetition type of the first PUSCH and/or of the second PUSCH, if the second PUSCH is scheduled with repetitions.

In another embodiment when a reception of a DCI format scheduling a second PUSCH transmission in slot i does not constitute an event that interrupts a DM-RS bundling TDW of length L of a first PUSCH transmission, the UE transmits a repetition of the first PUSCH in slot i. The accumulation of TPC commands within the TDW can include (i) TPC commands received in a DCI format 2_2 with CRC scrambled by TPC-PUSCH-RNTI during the TDW, if any, (ii) TPC commands received in a DCI format 2_2 with CRC scrambled by TPC-PUSCH-RNTI during the TDW, if any, and TPC commands received in a DCI format scheduling a second PUSCH in a slot within the TDW, if any, or (iii) TPC commands received in a DCI format 2_2 with CRC scrambled by TPC-PUSCH-RNTI during the TDW and one TPC command received in a DCI format scheduling a second PUSCH in a slot within the TDW.

When a UE is configured for operation with DM-RS bundling with a TDW of length L and is configured/indicated to transmit a first PUSCH with L repetitions in slots n=1, . . . , L, with a first spatial setting, the UE transmits repetitions within the TDW with a same power and same first spatial setting. The UE can be also provided a configuration of spatial settings and based on the configured spatial setting pattern, when the spatial setting changes within a nominal TDW, the actual TDW is modified to include transmissions with a same spatial setting. When a first spatial setting is configured for slots before slot i and a second spatial setting is configured for slots after and including slot i, or additionally or alternatively the UE receives a DCI format that includes an indication of a change of spatial setting starting from slot i, the change of the configured spatial setting and/or the reception of the DCI format including the spatial setting indication can constitute an event that interrupts the DM-RS bundling of the PUSCH repetitions transmitted with the first spatial setting. The UE transmits PUSCH repetitions with the first spatial setting in a first actual TDW wherein the last slot of the first actual TDW is slot i−1, and transmits PUSCH repetitions with the second spatial setting in a second actual TDW wherein the first slot of the second actual TDW is slot i. The UE accumulates TPC command values received within the first actual TDW and applies them for determining the power of the first repetition in the second actual TDW for PUSCH transmission with the second spatial setting. It is also possible that from slot i, the UE does not restart DM-RS bundling, applies TPC commands in PUSCH transmission occasions and transmits PUSCH with the second spatial. It is also possible that the reception of the DCI format including the second spatial setting indication does not constitute an event that interrupts the DM-RS bundling of the PUSCH repetitions transmitted with the first spatial setting, and the UE transmits using the second spatial setting after the TDW.

The method 1100, as illustrated in FIG. 11, describes an example procedure for a UE to determine a power for a PUSCH transmission when a UE is configured with resuming of DM-RS bundling operation after a transmission gap in the same TDW of the transmission gap according to the disclosure.

In step 1110, a UE (such as the UE 116) UE is configured for operation with DM-RS bundling with a TDW of length L and with DM-RS bundling after a transmission gap. In step 1120, the UE is configured/indicated to transmit a PUSCH with repetitions. In step 1130, the UE applies a first power $P_1$ to symbols of PUSCH repetitions that are transmitted before a transmission gap. In step 1140, the UE applies a second power $P_2$ to symbols of PUSCH repetitions that are transmitted after the transmission gap, wherein the second power is derived from the CLPC adjustment state before the transmission gap. Alternatively, in step 1140 the UE applies the first power $P_1$ to symbols of PUSCH repetitions that are transmitted after the transmission gap.

In certain embodiments, when a UE (such as the UE 116) is configured for operation with DM-RS bundling, the UE can also be configured a delay offset D of a number of symbols or slots to apply to a start of a DM-RS bundle after a transmission gap in the TDW where the transmission gap occurs. The delay offset configuration can be per UL BWP and for UEs operating in FDD mode or in HD-FDD mode. It is also possible that different values of the delay offset value can be configured for TDD mode and for FDD mode. Additionally, the applicability of the delay offset may depend on whether the transmission gap is due to a slot configuration by higher layers or is determined based on a DCI format. For example, for TDD operating mode, when the transmission gap is due to a slot being unavailable in an UL-DL TDD configuration, the delay gap cannot be applied or can have a smaller value than a delay offset that is applied when the transmission gap is due to an overlap with a transmission of higher priority or due to a reception of a DCI format including an UL CI indicating suspension of transmissions in time-frequency resources that include any time-frequency resources of a PUSCH repetition.

The method 1200, as illustrated in FIG. 12, describes an example procedure for an HD-FDD UE to determine a power for a PUSCH transmission according to the disclosure.

In step 1210, a UE (such as the UE 116) is configured to operate in HD-FDD mode and is configured for operation with DM-RS bundling with a TDW of length L and a delay offset D. In step 1220, the UE is configured to transmit PUSCH repetitions over a number of available slots and is indicated a respective number of PUSCH repetitions. In step 1230, the UE applies a first power for repetitions over a first set of available slots and determines a transmission gap of a number of slots after the first set of available slots. In step 1240, the UE determines an S-slot by applying the delay offset of D slots after the transmission gap. In step 1250, the UE applies a second power for repetitions over a second set of available slots with S-slot as the first slot.

It is noted that in step 1220, the UE uses a counting of repetitions based on consecutive slots, or based on available slots, wherein the counting excludes slots that are not available for repetitions in a UL-DL slot format configuration, wherein the slot configuration can be determined by RRC parameters or also based on indications by DCI formats.

The method 1300, as illustrated in FIG. 13, describes an example procedure for a UE to determine a power for a PUSCH transmission when the UE is configured with counting repetitions based on available slots according to the disclosure.

In step 1310, a UE (such as the UE 116) is provided an UL-DL TDD configuration over a number of slots and is configured for operation with DM-RS bundling with a TDW of length L. In step 1320, the UE is configured to transmit PUSCH repetitions over a number of available slots and is indicated a respective number of PUSCH repetitions. In step 1330, the UE determines a slot format from one or more higher layer parameters, such as the UL-DL TDD configuration, and TDWs over the number of slots. In step 1340, the UE applies a first power to symbols of PUSCH repetitions that are transmitted in available slots of a first of the TDWs.

Although FIG. 11 illustrates the method 1100, FIG. 12 illustrates the method 1200, and FIG. 13 illustrates the method 1300 various changes may be made to FIGS. 11-13. For example, while the methods 1100, 1200, and 1300 are shown as a series of steps, various steps could overlap, occur in parallel, occur in a different order, or occur multiple times. In another example, steps may be omitted or replaced by other steps. For example, steps of the method 1100-1300 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive:
first information indicating use of a same power for transmission of a channel over more than one slot, and
second information indicating use of a same power, after a change in power, for transmission of the channel over more than one slot; and
a processor operably coupled to the transceiver, the processor configured to determine:
a first number of consecutive slots for transmission of the channel,
a second number of consecutive slots, from the first number of consecutive slots, for transmission of the channel with a same power, and
a third number of consecutive slots, from the first number of consecutive slots and after the second number of consecutive slots, for transmission of the channel with a same power,
wherein the transceiver is further configured to transmit the channel with:
a first power in slots from the second number of consecutive slots, and
a second power in slots from the third number of consecutive slots.

2. The UE of claim 1, wherein a last slot from the second number of consecutive slots and a first slot from the third number of consecutive slots are non-consecutive slots.

3. The UE of claim 1, wherein:
the transceiver is further configured to receive third information indicating:
a first spatial setting for the transmission of the channel over the second number of consecutive slots and a second spatial setting for the transmission of the channel over the third number of consecutive slots,
a downlink (DL) second channel or signal, wherein the transceiver is further configured to receive fourth information for a pair of DL and uplink (UL) bandwidth parts (BWPs) and operation with a half-duplex mode for the pair of DL and UL BWPs,
a periodic configuration for a set of slots, wherein each slot from the set of slots includes UL, DL, or flexible (F) symbols, or
a frequency hopping (FH) interval, and
the processor is further configured to determine the second number of consecutive slots and the third number of consecutive slots based on the third information.

4. The UE of claim 1, wherein:
the transceiver is further configured to receive a physical downlink control channel (PDCCH) providing a downlink control information (DCI) format in a slot from the first number of consecutive slots, wherein the DCI format:
indicates a spatial setting for the transmission of the channel,
schedules a transmission of a second channel with a higher priority than the channel, or
indicates suspension for the transmission of the channel in one or more slots; and
the processor is further configured to determine that:
the second number of consecutive slots include slots before the slot, and
the third number of consecutive slots include slots after the slot.

5. The UE of claim 1, wherein:
the transceiver is further configured to receive:
a first physical downlink control channel (PDCCH) in a slot from the second number of consecutive slots, wherein the first PDCCH provides a first downlink control information (DCI) format that includes a value for a first transmit power control (TPC) command, and
a second PDCCH in a slot after the second number of consecutive slots and before a first slot of the third number of consecutive slots, wherein the second PDCCH provides a second DCI format that includes a value for a second TPC command;
the processor is further configured to determine an accumulated value of TPC commands that is applicable to the second power; and
the accumulated value of TPC commands: (i) includes a sum of the values of the first and second TPC commands or (ii) includes the value of the second TPC command and does not include the value of the first TPC command.

6. The UE of claim 1, wherein:
the transceiver is further configured to receive a physical downlink control channel (PDCCH) in a slot from the first number of consecutive slots, wherein the PDCCH provides a downlink control information (DCI) format that includes a value for a transmit power control (TPC) command; and
the processor is further configured to determine the second number of consecutive slots based on the value of the TPC command.

7. The UE of claim 1, wherein:
the transceiver is further configured to receive third information for a fourth number of consecutive slots for transmission of the channel with a same power; and
the first number of consecutive slots is at most equal to the fourth number of consecutive slots.

8. A base station (BS) comprising:
a transceiver configured to transmit:
first information indicating use of a same power for reception of a channel over more than one slot, and
second information indicating use of a same power, after a change in power, for reception of the channel over more than one slot; and
a processor operably coupled to the transceiver, the processor configured to determine:
a first number of consecutive slots for reception of the channel,
a second number of consecutive slots, from the first number of consecutive slots, for reception of the channel with a same power, and
a third number of consecutive slots, from the first number of consecutive slots and after the second number of consecutive slots, for reception of the channel with a same power,
wherein the transceiver is further configured to receive the channel with:
a first power in slots from the second number of consecutive slots, and
a second power in slots from the third number of consecutive slots.

9. The BS of claim 8, wherein a last slot from the second number of consecutive slots and a first slot from the third number of consecutive slots are non-consecutive slots.

10. The BS of claim 8, wherein:
the transceiver is further configured to transmit third information indicating:
a first spatial setting for the reception of the channel over the second number of consecutive slots and a second spatial setting for the reception of the channel over the third number of consecutive slots,
a downlink (DL) second channel or signal, wherein the transceiver is further configured to receive fourth information for a pair of DL and uplink (UL) bandwidth parts (BWPs) and for operation with a half-duplex mode for the pair of DL and UL BWPs,
a periodic configuration for a set of slots, wherein each slot from the set of slots includes UL, DL, or flexible (F) symbols, or
a frequency hopping (FH) interval, and
the processor is further configured to determine the second number of consecutive slots and the third number of consecutive slots based on the third information.

11. The BS of claim 8, wherein:
the transceiver is further configured to transmit a physical downlink control channel (PDCCH) providing a downlink control information (DCI) format in a slot from the first number of consecutive slots, wherein the DCI format:
indicates a spatial setting for the reception of the channel,
schedules a reception of a second channel with a higher priority than the channel, or
indicates suspension for the reception of the channel in one or more slots; and
the processor is further configured to determine that:
the second number of consecutive slots include slots before the slot, and
the third number of consecutive slots include slots after the slot.

12. The BS of claim 8, wherein:
the transceiver is further configured to transmit a physical downlink control channel (PDCCH) in a slot from the first number of consecutive slots, wherein the PDCCH provides a downlink control information (DCI) format that includes a value for a transmit power control (TPC) command; and
the processor is further configured to determine the second number of consecutive slots based on the value of the TPC command.

13. The BS of claim 8, wherein:
the transceiver is further configured to transmit third information for a fourth number of consecutive slots for reception of the channel with a same power; and
the first number of consecutive slots is at most equal to the fourth number of consecutive slots.

14. A method comprising:
receiving:
first information indicating use of a same power for transmission of a channel over more than one slot, and
second information indicating use of a same power, after a change in power, for transmission of the channel over more than one slot; and
determining:
a first number of consecutive slots for transmission of the channel,
a second number of consecutive slots, from the first number of consecutive slots, for transmission of the channel with a same power, and
a third number of consecutive slots, from the first number of consecutive slots and after the second number of consecutive slots, for transmission of the channel with a same power; and
transmitting the channel with:
a first power in slots from the second number of consecutive slots, and
a second power in slots from the third number of consecutive slots.

15. The method of claim 14, wherein a last slot from the second number of consecutive slots and a first slot from the third number of consecutive slots are non-consecutive slots.

16. The method of claim 14, further comprising:
receiving third information indicating:
a first spatial setting for the transmission of the channel over the second number of consecutive slots and a second spatial setting for the transmission of the channel over the third number of consecutive slots,
a downlink (DL) second channel or signal, wherein the method further comprises receiving fourth information for a pair of DL and uplink (UL) bandwidth parts (BWPs) and for operation with a half-duplex mode for the pair of DL and UL BWPs,
a periodic configuration for a set of slots, wherein each slot from the set of slots includes UL, DL, or flexible (F) symbols, or
a frequency hopping (FH) interval,
wherein determining the second number of consecutive slots and the third number of consecutive slots further comprises determining the second number of consecutive slots and the third number of consecutive slots based on the third information.

17. The method of claim 14, further comprising:
receiving a physical downlink control channel (PDCCH) providing a downlink control information (DCI) format in a slot from the first number of consecutive slots, wherein the DCI format:
indicates a spatial setting for the transmission of the channel,
schedules a transmission of a second channel with a higher priority than the channel, or
indicates suspension for the transmission of the channel in one or more slots; and
determining that:
the second number of consecutive slots include slots before the slot, and
the third number of consecutive slots include slots after the slot.

18. The method of claim 14, further comprising:
receiving:
a first physical downlink control channel (PDCCH) in a slot from the second number of consecutive slots, wherein the first PDCCH provides a first downlink control information (DCI) format that includes a value for a first transmit power control (TPC) command, and
a second PDCCH in a slot after the second number of consecutive slots and before a first slot of the third number of consecutive slots, wherein the second PDCCH provides a second DCI format that includes a value for a second TPC command; and
determining an accumulated value of TPC commands that is applicable to the second power, wherein the accumulated value of TPC commands: (i) includes a sum of the values of the first and second TPC commands or (ii) includes the value of the second TPC command and does not include the value of the first TPC command.

19. The method of claim 14, further comprising:

receiving a physical downlink control channel (PDCCH) in a slot from the first number of consecutive slots, wherein the PDCCH provides a downlink control information (DCI) format that includes a value for a transmit power control (TPC) command, wherein determining the second number of consecutive slots further comprises determining the second number of consecutive slots based on the value of the TPC command.

20. The method of claim 14, further comprising:

receiving third information for a fourth number of consecutive slots for transmission of the channel with a same power, wherein the first number of consecutive slots is at most equal to the fourth number of consecutive slots.

* * * * *